Nov. 21, 1950     R. L. GOLD     2,531,333
WRINGER

Filed July 11, 1947     3 Sheets-Sheet 1

INVENTOR.
Richard Lutz Gold
BY Otto Munk
HIS ATTORNEY.

Nov. 21, 1950 R. L. GOLD 2,531,333
WRINGER
Filed July 11, 1947 3 Sheets-Sheet 2
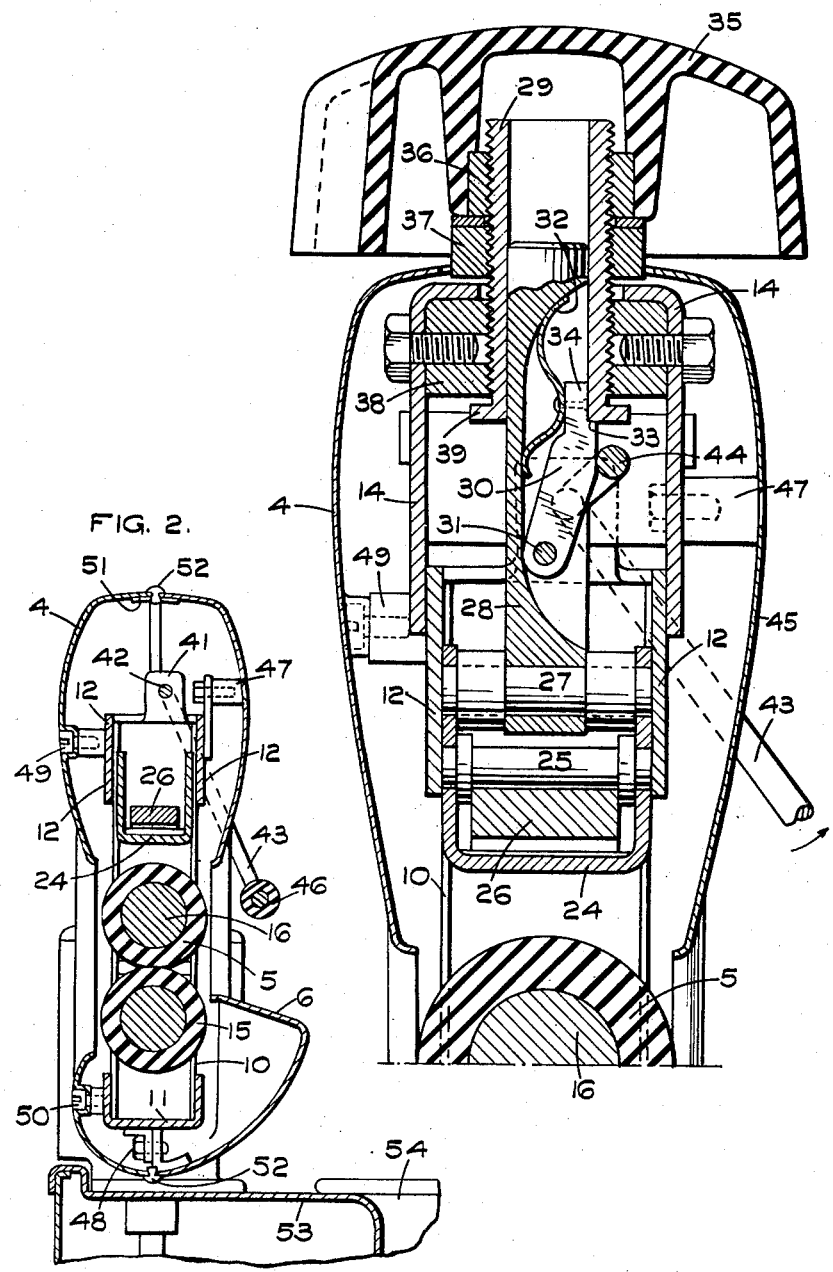
INVENTOR.
Richard Lutz Gold
BY Otto Munk
HIS ATTORNEY.

Nov. 21, 1950 R. L. GOLD 2,531,333
WRINGER
Filed July 11, 1947 3 Sheets-Sheet 3

INVENTOR
Richard Lutz Gold.
BY Richardson Daw,
AGENTS

Patented Nov. 21, 1950

2,531,333

UNITED STATES PATENT OFFICE 2,531,333

WRINGER

Richard Lutz Gold, Erdington, Birmingham, England

Application July 11, 1947, Serial No. 760,244
In Great Britain June 22, 1946

Section 1, Public Law 690, August 8, 1946
Patent expires June 22, 1966

4 Claims. (Cl. 68—263)

This invention relates to wringers of the kind comprising a pair of parallel rollers mounted for rotation in a frame, means being provided to apply spring pressure tending to force them together. The object of the present invention is to provide an improved construction.

According to the present invention, the spring pressure is applied to the bearings of one of the rollers by the ends of a plate spring housed in a stressed condition in a housing and projecting from the ends thereof, the housing being arranged parallel to the roller and means being provided for advancing it towards the roller, the stress of the spring initially being absorbed by the end portions of the housing and by an abutment in the center thereof, and the ends of the spring engaging or lying close to the bearings, and the stress being transferred to the bearing when the housing is advanced through a small distance towards the roller, whereby only a small movement of the housing towards the roller is required to apply full pressure to the bearings. With such an arrangement the necessary movement can be imparted to the housing by means of an operating screw and the housing can be moved from its initial position to the full pressure position by only a part turn of the screw.

The invention may also include an instantaneous release device by providing a pawl engaging an abutment in the means for moving the housing towards the roller and providing a release lever or member for moving the pawl away from the abutment.

For instance, the means for moving the housing towards the roller may incorporate an operating member having a screw action and a transmission member slidable in or on the operating member and coupled thereto by means of a pivoted pawl on the one member engaging a shoulder on the other member, the arrangement being such that while the pawl engages the shoulder, endwise movements of the screw member are transmitted to the transmission member and thence to the spring housing but when the pawl is moved clear of the shoulder, the spring housing and transmission member are free to move endwise in a direction away from the roller in or on the operating member.

The invention also includes the provision of a suitable cover for the frame in which the rollers are mounted and this cover may be made in two parts, one forming a cover for each side of the assembly and each part having an opening in a suitable position to give access to the rollers.

The invention is illustrated in the accompanying drawings, wherein:

Fig. 2 is a section on line 2—2 of Figure 1.

Fig. 3 is an enlarged section on line 3—3 of Figure 1.

Figure 1:
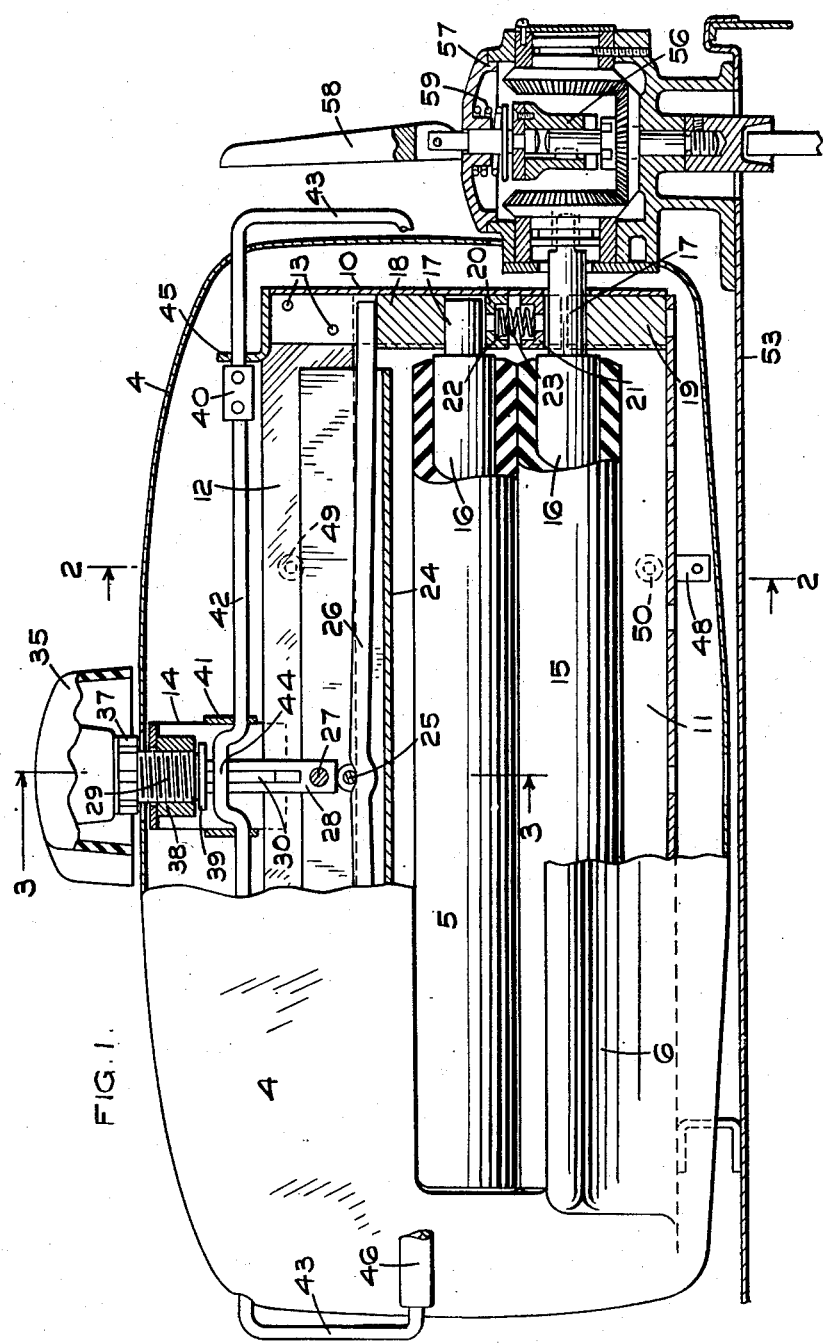
Fig. 1 is a part sectional front elevation of the wringer.
Figure 4:
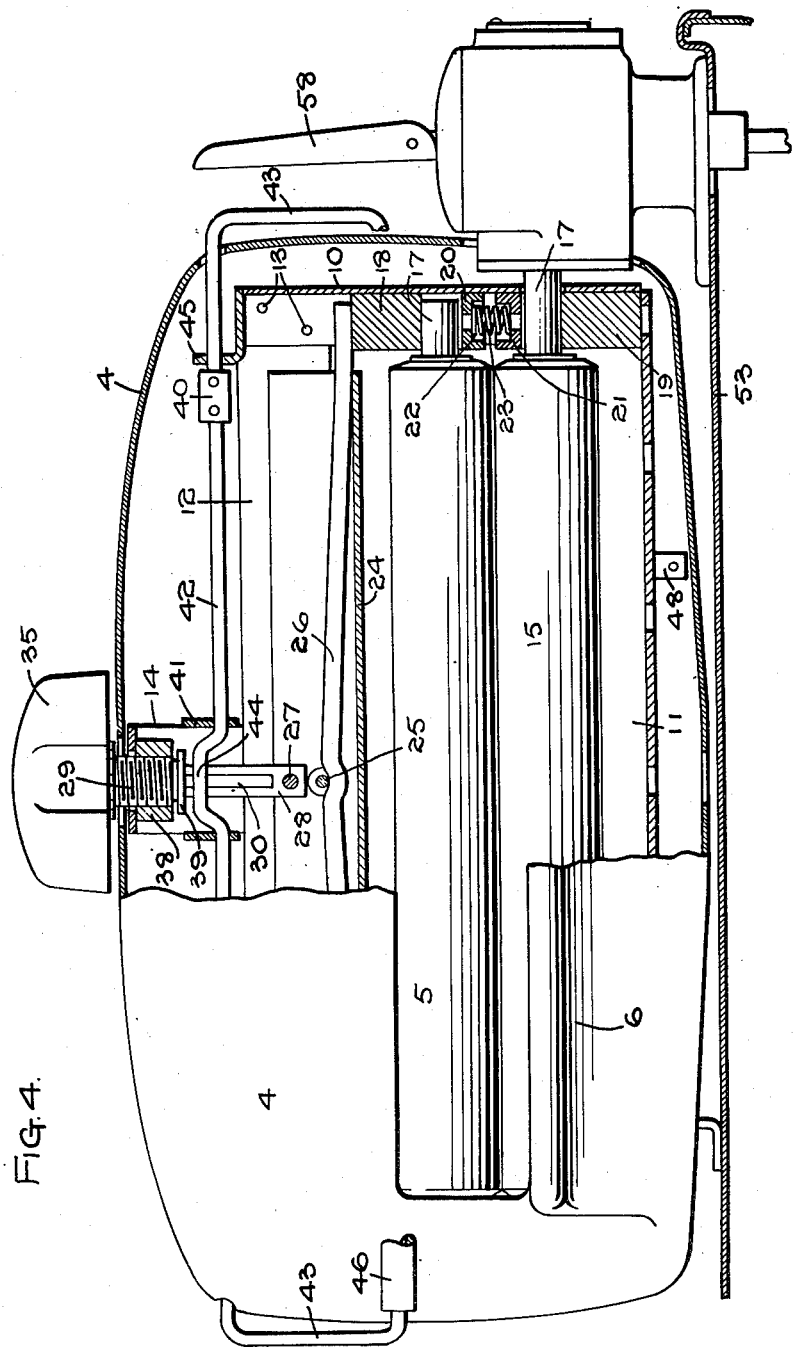
Fig. 4 is a view similar to Figure 1 showing the parts in their released position.

In the construction illustrated in the accompanying drawings the machine comprises a frame made up of four channel section members, comprising two vertical members 10, one at each end (only one shown in the drawings), a horizontal member 11 secured at its ends to the lower ends of the members 10, by welding or riveting, and, connecting the upper ends of the members 10 is a horizontally disposed member 12, having most of its base portion cut away, and the member 12 is secured to the members 10 by screws or similar fastenings 13.

The channels of the four frame members 10, 11 and 12 are arranged with their open sides directed inwardly towards the center of the frame and the top member 12 is provided with a bracket 14 of inverted channel or cup form forming a housing for the operating member.

The rollers 5, 15 may be made of metal covered with rubber and are arranged horizontally one above the other. The metal shaft 16 forming part of each roller is shouldered near its end and the reduced ends 17 engage in half bearings 18, 19. These half bearings are arranged one above the other in the vertical end members 10 of the frame, the upper half bearing 18 in each end member being free to slide up and down.

The top half bearing 18 may be provided with an extension 20 below the bearing ends of the top roller 5 and the bottom half bearing 19 may be provided with separate and detachable extension pieces 21 which project above the bearing ends of the bottom roller 15. At their adjacent sides, these extensions 20, 21 in each end member 10 of the frame may have recesses as at 22 and coiled compression springs 23 may be mounted in these recesses so that the weight of the upper roller, spring mechanism and operating mechanism is partially balanced.

Mounted parallel and above the upper roller 5 and within the frame is a horizontal channel shaped housing 24. The ends of this housing may be spaced from the inner edges of the end channel members 10 of the frame and the open side of this housing is disposed upwardly. At about the center, a transverse pin 25 arranged horizontally is fixed in this housing and this pin is employed to engage and retain in a stressed condition an elongated plate spring 26 formed as a strip housed in and extending along the housing. The ends of this spring 26 project from the ends of the housing 24 and in the initial position rest lightly on the tops of the upper half bearings 18 employed for the rollers.

At the center the spring 26 is bowed downwardly to engage under the pin 25 and when inserting the spring in the housing 24 it is stressed or loaded to a predetermined degree.

The arrangement is such that in the initial position, this stress is absorbed at the center by the pin 25 and at the ends by reason of the fact that near its ends the spring 26 bears upon the base of the housing 24. If, however, the housing is moved downwardly, even only a short distance, the stress of the projecting ends of the spring is transmitted to the half bearings 18 and thence to the upper roller 5.

Up and down motion can be applied to the housing 24 forming the spring housing by providing it with a second horizontal transverse pin 27 which is connected or passes through a central transmission member 28 made as a length of rod. This transmission member can slide in a hollow sleeve 29 engaging its upper part and relative endwise or axial movements between the sleeves 29 and the transmission member 28 is prevented by a pawl 30 pivoted at 31 at its lower end in a slot in the transmission member, the said pawl 30 carrying a light spring 32 which presses a portion of it out of the slot, this portion having a shoulder 33 engaging the lower end of the sleeve, said lower end being chamfered on its inner side. The pawl 30 is continued above the shoulder 33 where it has a portion 34 engaging the inner wall of the sleeve 29 so that the outward movement of the pawl 30 is limited thereby.

The sleeve 29 forms the operating member and is provided with a handle 35 by which it may be turned. This handle 35 is screwed on to the upper end of the sleeve above the bracket 14 in which the operating member works and the handle can be retained in position by lock nuts 36, 37 so that its position on the sleeve and the clearance between the lower lock nut 37 and the top of the bracket 14 can be adjusted.

The operating sleeve 29 is screwthreaded on its exterior surface and extends through the nut 38 fixed in the upper part of the bracket 14 carried by the top member 12 of the frame, and below the end of this nut 38 the sleeve is provided with an external flange 39, between the upper side of which, and the lower surface of the nut, is a small clearance.

The sleeve 29 forming the operating member can be screwed down in this nut 38 by turning the operating handle 35 by a short distance which is limited by the clearance between the top of the bracket 14 and the lower side of the nut 37 on the sleeve. This distance is sufficient to transfer the stress of the spring 26 from the spring housing 24 to the upper half bearing 18. The sleeve forming the operating member can also be moved upwardly by a short distance which is limited by the flange 39 at its lower end coming into engagement with the lower side of the nut 38, this distance being sufficient so that, when the pawl 30 is out of engagement with the sleeve 29 and is pressed upwards by the spring 26, the sleeve may be moved upwards sufficiently to allow the shoulder 33 of the pawl 30 to engage the lower end of the sleeve 29 under the action of the spring 32.

Endwise movements of the operating sleeve 29 are transferred to the transmission member 28 by means of the pawl 30 but an instantaneous release of the pressure of the upper roller can be obtained by rocking the pawl 30 to bring its shoulder 33 out of engagement with the lower end of the sleeve 29. When this is done, the transmission member 28 and the spring housing 24 and spring 26 and the upper roller 5 are all free to move upwardly.

The instantaneous release means comprises a horizontal rod 42 arranged across the machine and mounted in bearings 41 on its frame. This rod is cranked at the center and the crank 44 engages in front of the pawl 30 near to the position where the shoulder 33 of said pawl engages the lower portion of the sleeve 29.

The ends of this rod 42 are flattened and are coupled by means of sleeves 40 to the ends of downwardly extending U-shaped members 43 mounted in bearings 45 on the machine frame and the lower ends of these U-shaped members 43 are connected by a horizontal tube or bar 46 extending across the front of the machine.

The normal position of the U-shaped members 43 is inclined to the vertical so that the operating bar or tube 46 is disposed across the front end of the machine near to the rollers 5, 15 and in the case of an accident the operator can knock the bar or tube upwardly with his hand, causing the pawl 30 to be moved out of engagement with the sleeve 29 thus effecting an instantaneous release of the spring pressure.

When returning the parts after a release has been effected, the handle 35 of the operating member 29 is turned back to its original position so that the sleeve forming the operating member is lifted and the shoulder 33 of the pawl 30 then re-engages under its lower end automatically by reason of the pressure of the spring 32 associated with the pawl. After that, the handle of the operating member 29 can be given a part turn to restore the pressure to the upper roller 5.

In order to improve the appearance of the wringer, it may be provided with a two part metal cover 4, each formed as a hollow pressing adapted to enclose one side of the wringer, each cover portion being provided with an opening giving access to the rollers. In the case of the cover portion at one side, the cover member may be formed with an incline 6 giving a lead in for the clothes to the rollers.

Both parts of the cover may be secured by suitable brackets and screws 47, 48, 49 and 50, which may be arranged in pairs, to the frame of the wringer and may be provided with projecting positioning clips 51 at its edges, over which the edges of the other part of the cover are slid. Moulded rubber strips 52 may be provided between the adjoining edges of the cover thereby giving the wringer a more finished appearance.

The wringer thus constructed may be mounted upon the top of a wash boiler 53, the feed-in side for the clothes being disposed adjacent the boiler vessel 54 and the operating bar 46 for giving the quick release being disposed on the same side.

The arrangement of the securing means is such that the part of the cover adjacent the vessel 54 is first secured to the frame of the machine by means of the brackets and screws 47 and 48 which are otherwise invisible from the outside, that is to say, they cannot be seen from the front of the machine. The other part of the cover is then secured to the frame by means of the brackets and screws 49 and 50 as shown.

The drive is applied to the lower roller 15 through bevel gears in a gear box 57 attached to the wringer, the clutch 56 being operated by a lever 58, one end of which is of cam-like form so that if the lever is moved into one position, it releases the clutch and retains it in the release position, and if the lever is moved through a suitable angle it allows the clutch 56 to engage under the pressure of the spring 59.

What I claim then is:

1. A wringer comprising a frame, a pair of parallel rollers mounted for rotation in the frame, a housing slidably mounted in said frame, said housing being parallel to the rollers, an operating screw mounted on said frame and adapted to move said housing in a vertical plane, said operating screw comprising a handle, mounted externally of the wringer frame, and an externally threaded sleeve, a nut secured to the inside of the upper side of said frame, said externally threaded sleeve being adapted to move in said nut, an external flange on the lower end of said sleeve adapted to engage the lower face of said nut whereby upward movement of said sleeve is limited, locking nuts secured to the upper portion of said sleeve and adapted to engage the upper side of the frame whereby downward movement of said sleeve is limited, a spring mounted in a stressed condition in said housing and projecting from the ends thereof, an abutment mounted in the center of said housing, and bearings for said rollers mounted in said frame, the stress of said spring being initially absorbed by the end portions of said housing and by the abutment in the center thereof, and the ends of said spring resting lightly on said bearings, the stress of said spring being transferred from the ends of said housing to said bearings when the housing is advanced through a small distance towards the rollers, whereby only a small movement of said housing imparts full pressure to said bearings.

2. A wringer comprising a frame, a pair of parallel rollers mounted for rotation in the frame, a housing slidably mounted in said frame, said housing being parallel to the rollers, an operating screw including a sleeve member mounted for axial movement in said frame, a transmission member secured to said housing and adapted to engage in said sleeve, said transmission member including a pawl, a shoulder on said pawl adapted to engage the lower end of said sleeve, a spring mounted on said transmission member and urging said pawl into engagement with said sleeve, whereby movement of said operating screw is transmitted to said housing, a spring mounted in a stressed condition in said housing and projecting from the ends thereof, an abutment mounted in the center of said housing, and bearings for said rollers mounted in said frame, the stress of said spring being initially absorbed by the end portions of said housing and by the abutment in the center thereof, and the ends of said spring resting lightly on said bearings, the stress of said spring being transferred from the ends of said housing to said bearings when the housing is advanced through a small distance towards the rollers, whereby only a small movement of said carrier imparts full pressure to said bearings.

3. A wringer comprising a frame, a pair of parallel rollers mounted for rotation in the frame, a housing slidably mounted in said frame, said housing being parallel to the rollers, an operating screw including a sleeve member mounted for axial movement in said frame, a transmission member, including a pawl, secured to said housing, said pawl being adapted to engage the sleeve of said operating screw, a spring mounted in a stressed condition in said housing and projecting from the ends thereof, an abutment mounted in the center of said housing, bearings for said rollers mounted in said frame, the stress of said spring being initially absorbed by the end portions of said housing and by the abutment in the center thereof, and the ends of said spring resting lightly on said bearings, the stress of said spring being transferred from the ends of said housing to said bearings when the housing is advanced through a small distance towards the rollers, and an instantaneous release lever whereby the pressure on said rollers may be released, said release lever including a horizontal rod, cranked at its center, lying across the front of said wringer, said cranked portion being adapted to engage the front of the pawl of said transmission member whereby on an upward movement of said lever said pawl may be moved out of engagement with said sleeve.

4. A wringer comprising a frame, a pair of parallel rollers mounted for rotation in the frame, a housing slidably mounted in said frame, said housing being parallel to the rollers, an operating screw including a sleeve member mounted for axial movement in said frame, a transmission member secured to said housing and adapted to slide in said sleeve, a pawl secured to said transmission member and adapted to engage the lower end of said sleeve, whereby movement of said operating screw is transmitted to said housing, a spring mounted in a stressed condition in said housing and projecting from the ends thereof, an abutment mounted in the center of said housing, bearings for said rollers mounted in said frame, the stress of said spring being initially absorbed by the end portions of said carrier and by the abutment in the center thereof and the ends of said spring resting lightly on said bearings, the stress of said spring being transferred from the ends of said housing to said bearings when the housing is advanced through a small distance towards the rollers, whereby only a part turn of said operating screw imparts sufficient movement to said housing to apply full pressure to the bearings of said rollers, and an instantaneous release lever comprising a horizontal rod lying across the front of said wringer, there being a cranked portion at the center of said rod adapted to bear against said pawl whereby on an upward movement of said lever said pawl may be moved out of engagement with said sleeve and whereby said transmission member is permitted to slide upwardly in said sleeve under the influence of the spring mounted in said housing thereby releasing the pressure on said rollers.

RICHARD LUTZ GOLD.

REFERENCES CITED

The following references are of record in the file of this patent:

UNITED STATES PATENTS

| Number | Name | Date |
|---|---|---|
| 547,569 | Walker | Oct. 8, 1895 |
| 1,533,016 | Leech | Apr. 7, 1925 |
| 1,548,732 | Misner | Aug. 4, 1925 |
| 1,654,816 | Judelson | Jan. 3, 1928 |
| 1,847,187 | Jantz | Mar. 1, 1932 |
| 1,906,842 | Conarroe | May 2, 1933 |
| 2,125,887 | Cook | Aug. 9, 1938 |
| 2,227,130 | Etten | Dec. 31, 1940 |